Patented July 8, 1941

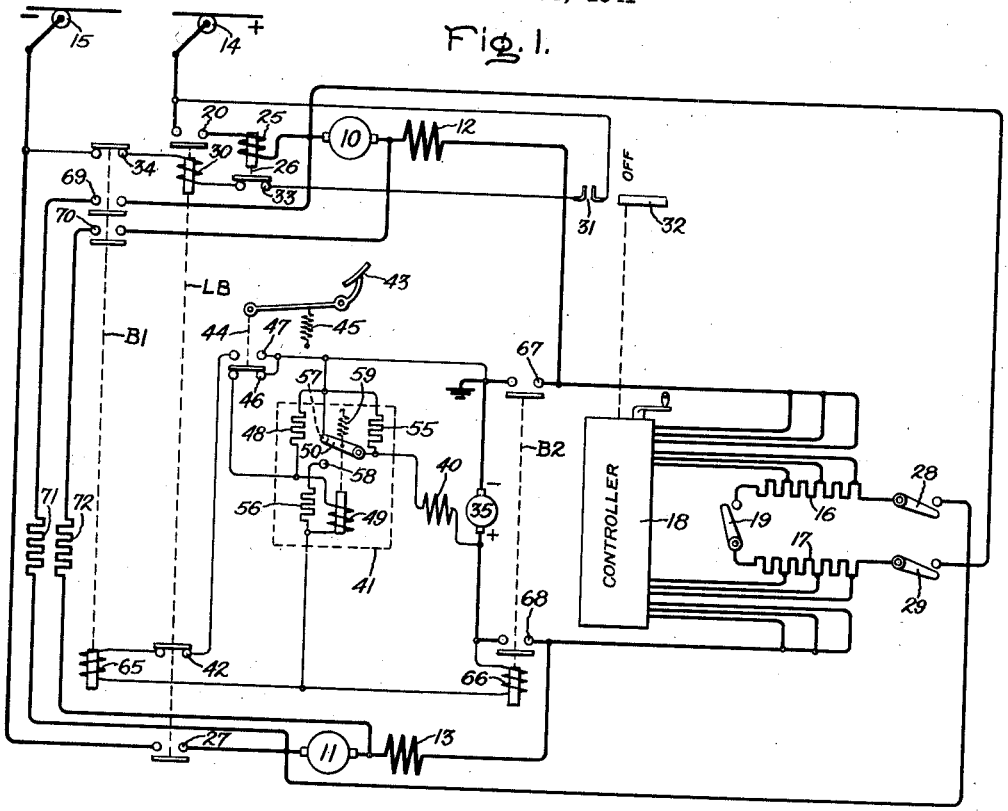

2,248,577

UNITED STATES PATENT OFFICE 2,248,577

ELECTRIC BRAKING SYSTEM

Jacob W. McNairy, Bridgeport, Conn., assignor to General Electric Company, a corporation of New York Application January 31, 1941, Serial No. 376,809

8 Claims. (Cl. 172—179)

My invention relates to electric braking systems for vehicles such as electric buses, railway cars and the like, and particularly to dynamic braking motor control systems for direct current series motors.

A necessary characteristic of any successful electric vehicle brake is that the braking effort have a definite maximum value sufficiently low to safeguard the mechanical parts of the vehicle transmission and the comfort of the passengers. A direct current self-excited dynamo-electric machine, when connected as a generator for dynamic braking, cannot of itself satisfy this requirement. Such a machine inherently provides a braking effort having a series characteristic with respect to the speed of the vehicle. When electric brakes are provided on railway cars having steel wheels rolling on steel rails the adhesion is sufficiently low so that slippage of the wheels may be depended upon to limit the maximum braking effort. However, in trolley coaches and buses the adhesion between the rubber tires and dry pavement is so great that wheel slippage cannot be depended upon to limit the braking effort.

One rather complicated method of reducing maximum braking effort is to provide a large number of increments of braking resistance. In order, however, to provide an inherently stable dynamic braking operation having a substantially constant braking effort over a wide range of vehicle speeds, the traction motor fields may be excited by a voltage which varies approximately inversely with the speed of the vehicle.

Accordingly, it is an object of my invention to provide a field exciting system for a direct current dynamo-electric machine which will enable the machine to develop a stable dynamic braking torque having a limited maximum value.

It is a further object of my invention to provide a field exciting system for use in connection with the dynamic braking of a dynamo-electric machine which shall operate only under partial load whenever the machine is not connected for dynamic braking.

It is a still further object of my invention to provide a field exciting system for use in connection with the dynamic braking of a dynamo-electric machine which will permit a very rapid build-up and prompt application of braking effort.

It is a still further object of my invention to provide a field exciting system for use in connection with the dynamic braking of a dynamo-electric machine which shall supply its rated voltage only during dynamic braking operation, whereby it is capable of withstanding relatively high overloads during such periods.

Among the outstanding advantages of my invention is its applicability to existing electrically driven vehicles not originally provided with electric braking.

I have shown my invention in one form as applied to a self-excited direct current electric vehicle drive of the series-parallel type provided with two traction motors and an accelerating resistor. For exciting the motor fields during braking I provide a small shunt excited direct current generator the excitation of which is controlled by a voltage regulator. This field exciting generator may advantageously be of the type commonly employed for battery charging service on internal combustion engine driven vehicles. In order to reduce the load upon the regulator during motoring operation means are provided for reducing the field excitation of the generator when the braking connections are disabled. For dynamic braking operation I energize the fields of the traction motors in series with each other and with a braking resistor from the small generator, and connect the armatures of the traction motors in series with each other across the braking resistor in such a manner that the voltage developed in the traction motor armatures opposes the voltage of the auxiliary generator.

For a more complete understanding of my invention reference should be had to the accompanying drawing in which Fig. 1 is a diagrammatic representation of an electric vehicle control system embodying my invention; Fig. 2 is a simplified circuit diagram of connections of the dynamic braking circuit; and Fig. 3 is a graphical representation of various braking effort characteristics.

Referring now to the drawing, and particularly to Fig. 1, I have shown an electric vehicle control system for two traction motors having armatures 10 and 11 and series fields 12 and 13, respectively. For motoring operation switching means are provided for connecting the motors in series or in parallel between positive and negative trolleys 14 and 15, respectively. Starting resistors 16 and 17 are arranged to control the acceleration of the motors in accordance with the position of an accelerating controller 18. By way of example I have shown the controller 18 as manually operated, but it will be understood by those skilled in the art that the controller may be automatically operated if desired by any one of a number of well known electric control systems. A switch 19 is arranged to connect the motors in series with the resistors 16 and 17 between the trolleys 14 and 15. This series circuit may be followed from the trolley 14 through a pair of contacts 20 of a line breaker LB, an operating coil 25 of an overload relay 26, the armature 10 and field 12 of one traction motor, the controller 18, the resistor 16, the resistor 17, another section of the controller 18, the field 13 and the armature 11 of the traction motor, and a pair of contacts 27 of the line breaker LB to the trolley 15. For operation of the motors in parallel a pair of switches 28 and 29 may be closed and the switch 19 opened. It is believed that the parallel circuit connection of the motors will be obvious in view of the series circuit previously traced. I wish to have it understood that, while I have shown the switches 19, 28 and 29 as manually operated, these switches may be arranged for automatic control, if desired, by any electric control system well known to those skilled in the art.

For connecting the motors to the trolleys 14 and 15 for motoring operation I have shown the line breaker LB provided with an operating coil 30 which is energized from the trolleys 14 and 15 through a contact finger 31 operated by a cam 32 associated with a controller 18. The energizing circuit for the operating coil 30 also includes a pair of normally closed contacts 33 on the overload relay 26 and a pair of normally closed contacts 34 associated with a braking contactor B1. The cam 32 is arranged to maintain the contact finger 31 closed in all running positions of the controller 18 but to open the contact finger when the controller is in its off position.

For completing dynamic braking connections, my preferred arrangement includes a pair of braking contactors B1 and B2 which are energized from an axle driven field exciting generator 35 when braking is called for. The excitation of the shunt field 40 of the generator 35 is controlled during dynamic braking and motoring operation by a voltage regulator 41.

During motoring operation the line breaker LB is picked up, and energization of the braking contactors B1 and B2 is prevented by the opening of a normally closed interlock contact 42 on the line breaker. An operating pedal 43 for a braking controller (not shown) is operatively connected to a transfer switch 44 and biased into the position shown in Fig. 1 by a spring 45. The transfer switch 44 comprises two pairs of contacts 46 and 47. During motoring operation the biased pedal 43 maintains the contacts 46 closed and the contacts 47 open. The contacts 46, when closed, short circuit a calibrating resistor 48 in the circuit of a voltage responsive operating coil 49 of the regulator 41. The operating coil 49 of the regulator is thereby enabled to operate the movable contact arm 50 at a relatively low voltage. Consequently during motoring operation the terminal voltage of the generator 35 is maintained at a relatively low value.

For maintaining any predetermined voltage the regulator 41 is provided with two resistors 55 and 56 and a pair of stationary contacts 57 and 58. The movable contact 50 of the regulator is biased into engagement with the stationary contact 57 by a spring 59. When the contacts 50 and 57 are in engagement, the shunt field 40 of the generator 35 is connected directly across the output terminals of the generator. If the generator voltage tends to rise sufficiently to enable the operating coil 49 of the regulator to disengage the contacts 50 and 57, the shunt circuit around the resistor 55 is removed and this resistor is placed in series with the shunt field 40 of the generator. The decrease in generated voltage resulting from the connection of the series resistor 55 ordinarily so reduces the operating force of the coil 49 that the contacts 50 and 57 will again engage. Ordinarily this regulating action of the contact 50 on the contact 57 is sufficient to maintain a predetermined voltage. If, however, the generator voltage tends to rise sufficiently to cause the contact 50 to engage the contact 58, as due to a very high vehicle speed, a field shunting resistor 56 is connected across the shunt field 40 of the generator 35 to further reduce the field energization.

The vehicle may be allowed to coast by returning the master controller 18 to its "off" position shown in Fig. 1 and allowing the brake pedal 43 to remain in the biased "off" position shown. With the controllers in these positions neither the motoring nor the braking circuits are established. The energizing circuit for the line breaker LB is disabled at the contact finger 31 of the controller 18, while the energizing circuit for the operating coils 65 and 66 of the braking contactors B1 and B2, respectively, is disabled at the contacts 47 of the pedal operated transfer switch 44.

In order to establish dynamic braking the braking pedal 43 must be depressed. With the first movement of the braking pedal the transfer switch 44 opens its contacts 46 and closes its contacts 47. With the opening of the contacts 46 the operating point of the voltage regulator 41 is raised due to the insertion of the resistor 48 in series with the operating coil 49 of the regulator. When the contacts 47 of the transfer switch 44 are closed an energizing circuit is completed for the operating coils 65 and 66 of the braking relays B1 and B2, respectively. This energizing circuit may be traced from the positive side of the generator 35 through the operating coils 66 and 65 in series and the contacts 47 of the transfer switch 44 to the grounded side of the generator 35. When the braking contactor B2 picks up it connects the field exciting generator 35 to the traction motors fields 12 and 13 through the contacts 67 and 68, respectively, of the contactor B2. When the braking contactor B1 picks up it closes its contacts 69 and 70 to connect the braking resistors 71 and 72, respectively, across the fields and armatures of the traction motors in the manner shown in Fig. 2.

From an inspection of the polarities indicated on Fig. 1 it will be observed that when the braking connections are established the field exciting generator 35 supplies to the field windings 12 and 13 a direct current of the same polarity as the current supplied to these windings during motoring operation. The voltage generated in the armatures 10 and 11 of the traction motors will therefore be in the same direction as the back electromotive force developed during motoring operation and will send a current through these armatures in a direction opposite to that of the current flowing through the armatures during motoring. Referring now particularly to Fig. 2 it will be observed that the voltage of the field exciting generator 35 is opposed by the voltage generated in the armatures 10 and 11 of the traction motors, and that these voltages tend to send additive currents through the braking resistor 72.

It will now be apparent that the voltage available for exciting the field windings 12 and 13 is the difference of the voltages generated by the field exciting generator 35 and the traction motor armatures 10 and 11. Thus, at standstill the excitation of the field windings 12 and 13 is a maximum; and the field winding excitation gradually diminishes as the vehicle speed and traction motor armature voltage increases. The result of this arrangement is that at high vehicle speeds the braking effort does not build up with a series characteristic but tends to limit itself to a definite maximum, while, as the speed of the vehicle and the voltage of the armatures 10 and 11 decreases, the current through the field windings increases to maintain a substantially constant dynamic braking effort over a wide range of vehicle speeds.

In Fig. 3 I have shown on curve A the braking effort characteristic of a direct current series excited generator when simply connected in a loop circuit with a resistor for dynamic braking. Curve B represents the braking effort characteristic obtained from a system constructed in accordance with my invention.

By automatically recalibrating the voltage regulator 41 to maintain a low voltage at the terminals of the field exciting generator 35 whenever the traction motors are not connected for dynamic braking, my invention greatly reduces the load on the regulator contacts over a major portion of its operating period. Ordinarily, dynamic braking connections are established for only a small part of the operating period of the vehicle. Furthermore, the operation of the field exciting generator 35 at reduced voltage is preferable to complete the deenergization of the generator shunt field during motoring operation. By operating the generator at reduced voltage during motoring operation a very quick build-up and prompt application of braking effort is made possible. This is due to the fact that in the building up of a self-excited machine most of the time required for build-up is utilized to establish the initial voltage rise. By operating the generator at reduced voltage the time required to establish an initial voltage rise is eliminated. Operation of the machine partially excited at all times also prevents accidental reversals of polarity such as have been found to occur under certain conditions if the generator is operated without excitation when the braking connections are not established. A further notable advantage of my invention is its ability to take relatively heavy overloads during braking operation. Since the dynamic braking cycle is of relatively short duration, the field exciting generator ordinarily operates at a relatively low temperature due to the fact that core and excitation losses are reduced by the low voltage setting of the regulator.

While I have shown one preferred embodiment of my invention, it will be understood of course, that I do not wish to be limited thereto since various modifications will occur to those skilled in the arts; and I, therefore, contemplate by the appended claims to cover all such modifications as fall within the true spirit and scope of my invention.

What I claim as new and desire to secure by Letters Patent of the United States is:

1. In a dynamic braking system, a momentum driven dynamo-electric machine having an armature and a series field winding, a braking resistor connected in circuit with said armature, a momentum driven generator connected with said field winding and said resistor, and means for reducing the excitation of said generator upon the removal of load therefrom.

2. In a dynamic braking system, a braking controller, a momentum driven dynamo-electric machine having an armature and a series field winding, a braking resistor connected to complete a dynamic braking circuit including said armature, a momentum driven generator connected in series with said field winding across a portion of said dynamic braking circuit, and means operable in conjunction with said braking controller for controlling the excitation of said generator.

3. In a dynamic braking system, a braking controller a momentum driven dynamo-electric machine having an armature and a series field winding, a braking resistor connected to complete a dynamic braking circuit including said armature, a momentum driven generator connected in series with said field winding across a portion of said dynamic braking circuit, and switching means operable in conjunction with said braking controller for increasing the excitation of said generator upon the establishment of dynamic braking and decreasing the excitation of said generator upon the discontinuance of dynamic braking.

4. In a dynamic braking system, a momentum driven dynamo-electric machine having an armature and series field winding, a braking resistor connected to complete a dynamic braking circuit including said armature, a braking controller, a momentum driven generator connected in series with said field winding across said braking resistor, a voltage regulator for controlling said generator, and means operable in conjunction with said braking controller to change the calibration of said voltage regulator.

5. In a dynamic braking system, a braking controller, a momentum driven direct current dynamo-electric machine having an armature and a series field winding, a dynamic braking resistor for said machine, first switching means arranged to complete a dynamic braking circuit including said armature and said resistor, a momentum driven generator for exciting said field winding, second switching means arranged to connect said generator and said series field winding to a portion of said dynamic braking circuit in such a manner that the voltage of said generator opposes the voltage developed in said armature during dynamic braking, and third switching means operable in conjunction with said braking controller for controlling the excitation of said generator.

6. In a dynamic braking system for an electric vehicle, a direct current traction motor provided with an armature and a series field winding, a dynamic braking resistor for said motor, first switching means arranged to complete a dynamic braking circuit including said armature and said resistor, a momentum driven direct current generator for exciting said field winding, second switching means arranged to connect said generator and said series field winding to a portion of said dynamic braking circuit in such a manner that the voltage of said generator opposes the voltage developed in said armature during dynamic braking, a voltage regulator for maintaining the voltage of said generator substantially constant over a wide range of speed of said vehicle, electro-responsive operating means for said first and second switching means, and control means arranged simultaneously to energize said operating means and to change the calibration of said voltage regulator.

7. In a dynamic braking system for an electric vehicle, a direct current traction motor provided with an armature and a series field winding, a dynamic braking resistor for said motor, a braking controller having an off position, first switching means arranged to complete a dynamic braking circuit including said armature and said resistor, a momentum-driven direct current generator provided with a shunt field winding, second switching means arranged to connect said generator in series with series field winding to a portion of said dynamic braking circuit in such a manner that the voltage of said generator opposes the voltage developed in said armature during dynamic braking, a voltage regulator for controlling said shunt field winding to maintain the voltage of said generator at a substantially constant selected value over a wide range of speed of said vehicle, electro-responsive operating means for said first and second switching means, and third switching means operable upon movement of said braking controller from its "off" position simultaneously to complete an energizing circuit for said operating means and change the calibration of said voltage regulator.

8. In a dynamic braking system for an electric vehicle, a plurality of direct current traction motors each provided with an armature and a series field winding, a dynamic braking resistor for said motors, a braking controller having an off position, first switching means arranged to complete a dynamic braking circuit including said armatures and said resistor, a momentum-driven direct current generator provided with a shunt field winding, second switching means arranged to connect said generator in series with said series field windings to a portion of said dynamic braking circuit in such manner that the voltage of said generator opposes the voltage developed in said armatures during dynamic braking, a voltage regulator for controlling said shunt field winding to maintain the voltage of said generator at a substantially constant selected value over a wide range of speed of said vehicle, electromagnetic operating means for said first and second switching means, and a transfer switch operable upon movement of said braking controller from said off position to complete an energizing circuit for said operating means and to connect a calibrating resistor in series with said voltage regulator.

JACOB W. McNAIRY.